(No Model.)
J. C. POTTER.
EVENING MECHANISM FOR COTTON OPENERS.
No. 524,730. Patented Aug. 21, 1894.
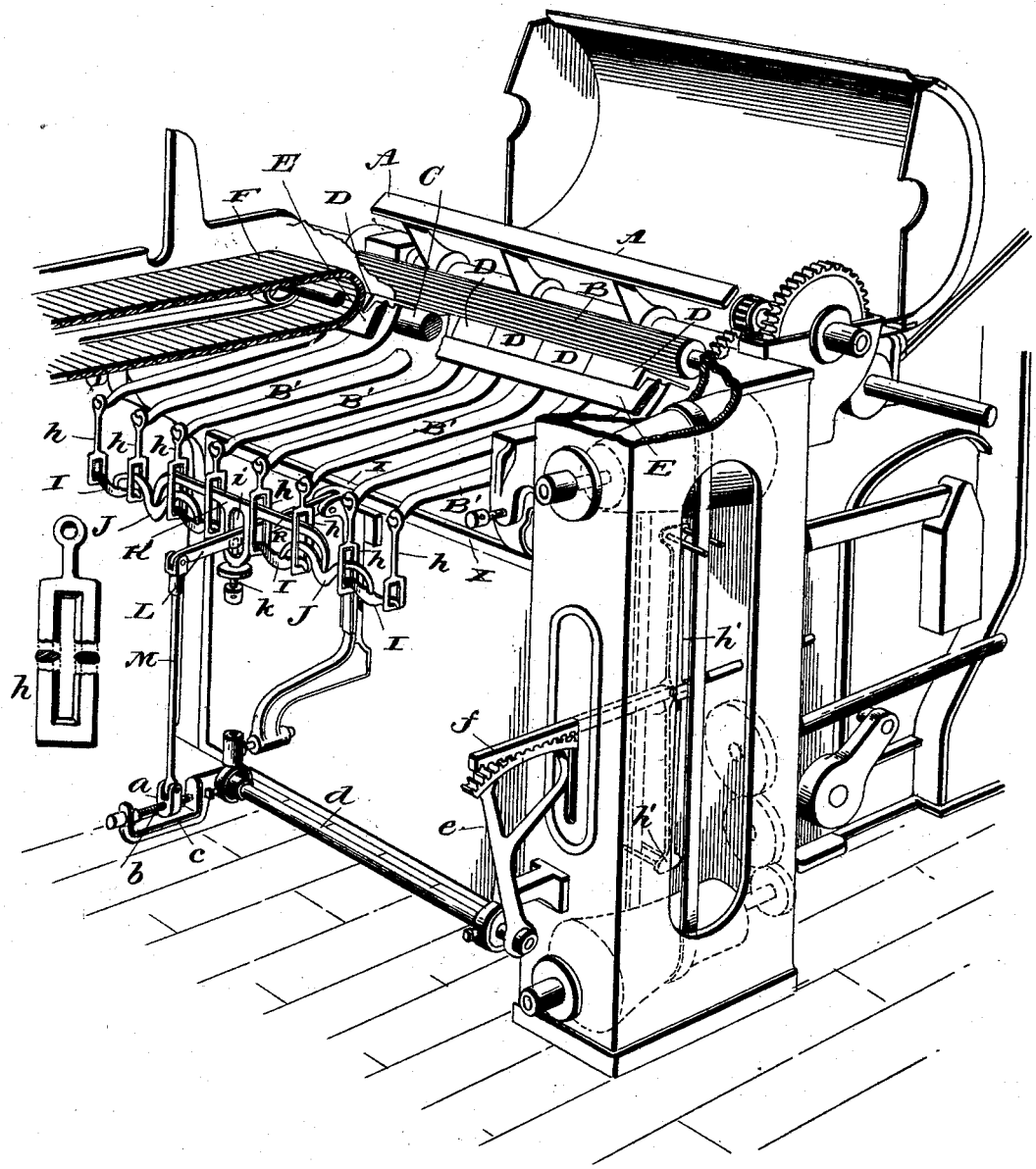
Witnesses:
L. C. Hills.
Evella Dick.
Inventor
J. C. Potter
by Marcellus Bailey
his Attorney

UNITED STATES PATENT OFFICE.

JAMES C. POTTER, OF PAWTUCKET, RHODE ISLAND.

EVENING MECHANISM FOR COTTON-OPENERS.

SPECIFICATION forming part of Letters Patent No. 524,730, dated August 21, 1894.

Application filed March 30, 1894. Serial No. 505,753. (No model.)

*To all whom it may concern:*

Be it known that I, JAMES C. POTTER, residing in Pawtucket, in the State of Rhode Island, have invented certain new and useful Improvements in Evening Mechanism for Cotton-Openers and other Engines or Machines for Working Cotton and other Fibrous Materials, of which the following is a specification.

My invention has relation to the scale lever system through which the movement of the evener plates or other evening devices over which the fibrous material passes into the machine is transmitted to the belt of the cone-drums. And it has more particular reference to that kind of scale lever system in which the smallest scale levers—those directly suspended from the evener arms—are at the bottom of the system and the main scale lever is at the top of the system.

The invention involves the employment for suspensory purposes of links hung loosely upon the evener arms at their upper ends and furnishing support at their lower ends to the lowest or smallest scale levers, these links being slotted so as to both support and guide not only the small scale levers which rest directly on them but also all of the superposed scale levers—which latter pass through the slotted links which they adjoin.

In the accompanying drawing I have represented in isometric perspective so much of a cotton opener or scutcher as needed to illustrate my invention—part of the feed apron, &c., being broken away to expose the parts which embody the invention.

B, C, are the feed rolls and A is the beater. The evener plates which co-operate with the upper roll B are shown at D fulcrumed on the knife edge bar E.

F is the feed apron.

B' are the arms or extensions of the evener plates.

The number of evener plates used can of course vary. There are eight of them employed in the present instance. Therefore the first row of scale levers I, contains four scale levers—one for each pair of plates. The arms B' are connected to opposite ends of the small scale levers I by links $h$ each of which holds over its arm B' and under the appropriate end of the lever I to which it is to be connected. The links are longitudinally slotted as shown; and the bottom edge of the slot has a $\wedge$ form in cross section forming a knife edge on which the scale lever I rests. For reasons hereinafter explained the sides of the slot in each link have like formed edges. These levers I form the lowermost row. Above them are placed the levers J of the second row—two in number— each straddling the space between the two levers I of the pair to which it pertains and resting at its ends upon the central points of the levers I. The ends of each lever J for this purpose pass through the slots of the two links $h$ between which it extends—the slots being made long enough for this purpose. The side edges of the slots are $\wedge$ shaped or beveled, thus presenting but a knife edge to the levers and consequently avoiding friction between them as far as possible, while at the same time affording lateral guidance and support for the levers.

Bridging the space between the two scale levers J, is the superposed main scale lever K, supported at its ends upon the central points of the levers J, and passing through the guide slots in the four links $h$ through which its ends must extend in order to reach those points.

The main scale-lever can impart its movement to the cone-belt shipper through any suitable intermediaries. In the present instance the movement transmitting instrumentalities comprise a lever L pivoted to the girt X of the machine, and at its outer end jointed to a connecting rod M, which at its lower end is jointed to a nut $a$ on a screw $b$ mounted in a radial arm $c$ fast to rock shaft $d$ carrying the toothed sector $e$ through which movement is imparted to the sliding rack bar $f$ which carries the cone-belt shipper $h$—this being a well known arrangement for the purpose.

The lever L extends at its outer end through a slot $i$ in the main scale lever K, and is supported on an adjusting screw $k$ the point of which projects up into the slot $i$ and is received in a socket or recess in the under edge of lever L. By means of this screw the normal position of the belt on the cones can be adjusted as desired.

What I claim herein as new and of my own invention is—

A scale lever system comprising scale levers suspended by slotted guide links from the evener arms, in combination with other scale levers superposed and supported thereon, the main scale lever being at the top of the system, and the ends of all the superposed levers passing through the slotted guide links which they adjoin, as set forth.

In testimony whereof I have hereunto set my hand, before two subscribing witnesses, this 28th day of March, 1894.

JAMES C. POTTER.

Witnesses:
DANIEL F. BROWN,
THOMAS P. BARNEFIELD.